Jan. 23, 1968  F. C. WILLIAMS  3,365,719
SYSTEM FOR SIMULATING RADAR TERRAIN RETURNS
Filed July 18, 1966  3 Sheets-Sheet 1

Frederick C. Williams,
INVENTOR.
BY
J. K. Haskill
ATTORNEY.

United States Patent Office 3,365,719
Patented Jan. 23, 1968

3,365,719
SYSTEM FOR SIMULATING RADAR
TERRAIN RETURNS
Frederick C. Williams, Topanga, Calif., assignor to
Hughes Aircraft Company, Culver City, Calif., a
corporation of Delaware
Filed July 18, 1966, Ser. No. 566,058
20 Claims. (Cl. 343—17.7)

ABSTRACT OF THE DISCLOSURE

A radar terrain characteristic simulator for use in testing of a radar unit. A common reference carrier frequency is coupled between the equipment being tested and a simulator which is located at a site remote from the radar. The distance between these sites being proportional to the range being simulated. Terrain characteristics are simulated by generating a group of signals of differing frequencies to simulate Doppler returns. Each of these signals is modulated with the common carrier and is amplitude and phase adjusted, and then individually and simultaneously transmitted to the equipment under test.

---

This invention relates to radar system test equipment, and more particularly to a system for simulating radar terrain return signals having a variety of characteristics to permit accurate testing of a radar tracking system.

Prior to the present invention, the effectiveness of the radar receiver and antenna positioning circuits of a moving target indicator radar must have been tested by actually installing the equipment in an aircraft. The operative fitness of the tracking circuitry in a radar terrain return environment is usually tested by flying the aircraft over geographic areas having known or experimentally determined terrain characteristics. To implement this type of checkout and testing requires costly installation and flying time and availability of the particular terrain type for the necessary tests. The purpose of the present invention is to simulate the variety of characteristics of radar terrain returns without flying the radar to be tested. The present invention eliminates the need for flight testing of any angular discriminating circuitry, including the receiver and antenna positioning circuits by simulating the characteristics of any radar terrain return environment.

It is therefore an object of the system of the present invention to simulate Doppler return signals from terrain which is also at a predetermined simulated range.

Another object of the system of the present invention is to simulate fixed radar terrain return characteristics.

A further object of the system of the present invention is to simulate controlled variable radar terrain return characteristics.

Briefly, the radar terrain simulator system according to one embodiment simulates Doppler return signals from a series of terrain patches by initially employing a stable oscillator as an L-band frequency source located at the site of the radar system under test and transmitting this frequency to the site of the terrain simulator. The physical location of the sites is a function of the range being simulated. The terrain simulator includes a reference and offset frequency generator, a Doppler frequency generator, a modulator and a means for radiating. The reference and offset frequency generator generates an offset frequency used within the Doppler frequency generator which is coupled to the modulator. Within the Doppler frequency generator there is a series of low frequency oscillators corresponding to a series of Doppler frequencies expected from a series of terrain patches. A reference frequency, which becomes the carrier frequency, is coupled to the modulator wherein a the Doppler frequencies generated are modulated by pulsed modulation. By phase comparing the frequency of each Doppler oscillator with the offset frequency, pulses are generated resulting in a spectrum of frequencies expected from a radar terrain environment. The entire series of Doppler frequencies are simultaneously radiated to the site of the equipment being tested where the identical reference frequency is also available; this permits accurate measurement of the response of the target tracking circuitry under test with relationship to the types of terrain returns simulated. The frequency spectrum generated by the radar terrain simulator represent an expected Doppler frequency shift from a moving radar as well as the amplitude variation and phase shifts encountered as terrain characteristics.

The features, objects and advantages of the present invention will appear from the following description of exemplary embodiments thereof illustrated in the accompanying drawings wherein like reference characters refer to like parts and wherein.

Figure 5:
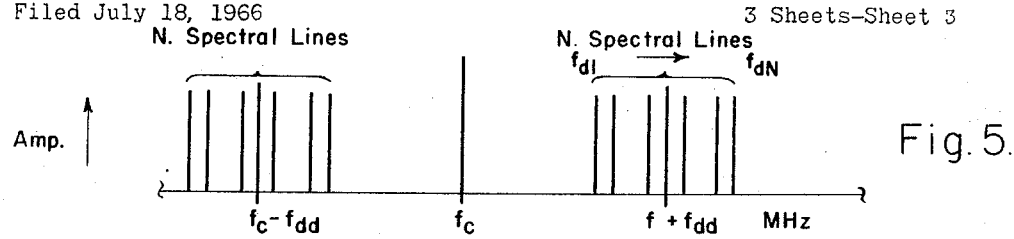
Figure 6:
Figure 7:
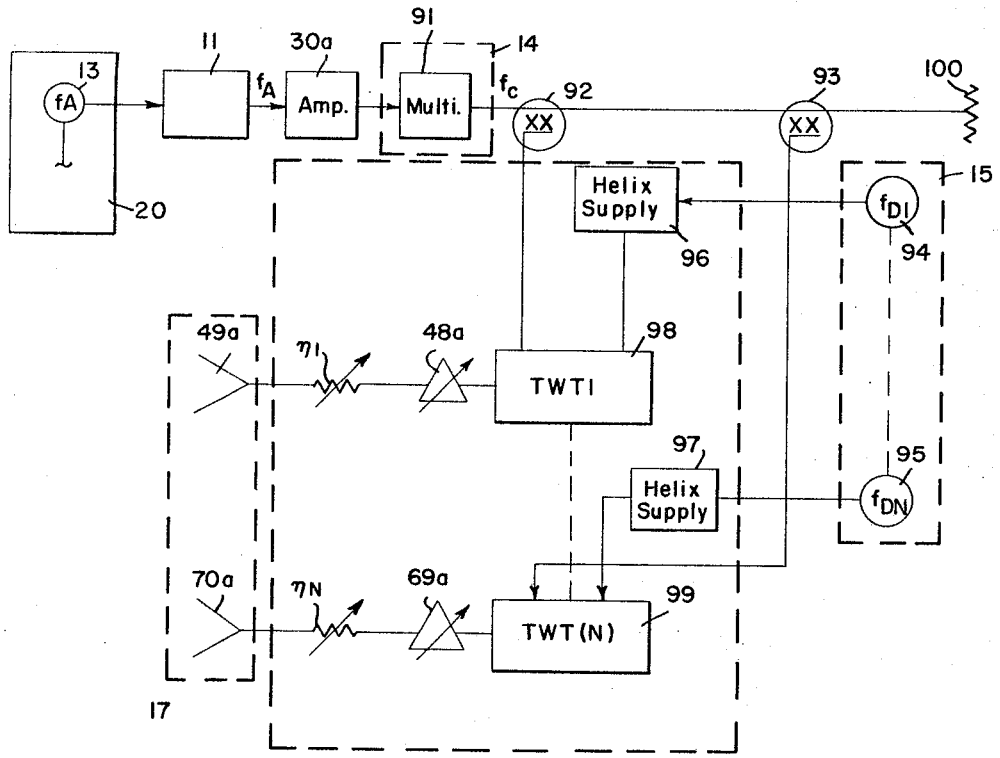

FIG. 5 broadly illustrates the Doppler frequency spectra generated by the present invention;

FIG. 6 illustrates the amplitude adjustment of the simulated Doppler frequency spectra; and FIG. 7 is a schematic block diagram illustrating a system of the present invention utilizing frequency modulation.

Figure 1A:
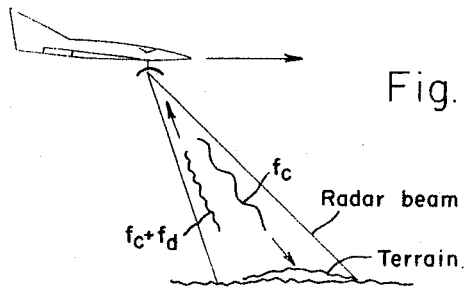
FIGURE 1(a) is a pictorial representation of a moving radar system and the terrain illuminated by the radar beam.
Figure 1B:
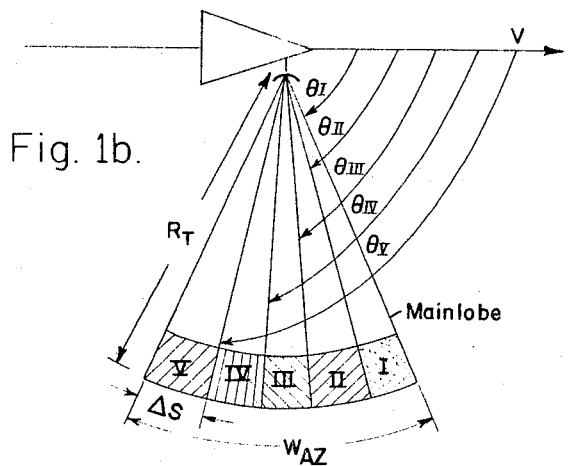
FIG. 1(b) is a plan view of the terrain patches simulated by the present invention.

The Doppler frequency environment for a moving radar is illustrated by FIGS. 1(a) and 1(b). There is shown in FIG. 1(a) an aircraft moving at a certain velocity with the radar system antenna beam striking the terrain. The transmitter carrier frequency $f_c$ strikes the terrain, and due to the motion of the source, a return signal reflected from the terrain is accepted by the receiver that has been frequency shifted by $f_d$, the Doppler frequency shift. Therefore, the signal return frequency from the ground is $f_c + f_d$. This Doppler phenomenon is well-known to those skilled in the art and the Doppler frequency shift equation is usually expressed as $$f_d = \frac{2\dot{r}}{\lambda}$$

where $\dot{r}$ is the radial velocity between the source and the target and $\lambda$ is the wavelength of the carrier frequency.

FIG. 1(b) illustrates the plan view in rectangular coordinates of the Doppler frequency returns as a function of the azimuth angle of the radar antenna beam and the velocity of a moving radar source. The Doppler frequency is now expressed as $f_d = f_c \, 2v/c \cos \theta$ where $c$ is the velocity of light, $v$ is the magnitude of the velocity vector relative to the target (terrain), $f_c$ is the carrier frequency of the radar, and $\theta$ is the angle between the velocity vector and the radar beam position. The tracking function of a moving radar system usually involves the receiver and the servo tracking functions (antenna positioning circuits), and has as its main objective to keep the radiating antenna main lobe positioned as close to the direction of the target signal position as possible. In the illustration, the ground patches become the target and the signal return includes the carrier and the effects of terrain on the carrier. In the FIG. 1(b) there is shown the main lobe of the antenna striking the series of ground patches I through V, the patches distributed over the azimuth width of the beam $W_{AZ}$. Each of the ground patches are at an azimuth position from the velocity direction vector by a corresponding azimuth angle $\theta_I$ through $\theta_V$. By knowing the carrier frequency ($f_c$) and the azimuth position, the Doppler shifted frequencies for the patches can be calculated according to the formula expressed supra. Further, the angular separation of each ground patch I through V is easily calculable by the simple procedure of difference angles. With the a priori knowledge regarding the carrier frequency and azimuth angles the Doppler frequencies are determinable. In addition to the determinable Doppler frequency returns, the ground struck by a radar beam exhibits other characteristics which affect the amplitude and phase shift of a return signal. Usually the amplitude and phase characteristics of the return signal can be represented by a random distribution whose characteristics are dependent upon the physical structure (e.g.: water, moving water, grass, rock, etc.) of the ground.

An example of Doppler frequency shift, differing from ground patch I to ground patch II may be expressed as follows:

let
$$f_I = f_c \, 2v/c \cos \theta_I$$
and let
$$f_{II} = f_c \, 2v/c \cos (\theta_I + \delta)$$

where $\delta$ is the angle $\theta_I - \theta_{II}$ representing the angle between the respective ground patches I and II. Taking the difference $(f_I - f_{II})$ and expanding by normal trigonometric function operation we have:

$$f_I - f_{II} \cong f_c \, \delta \, 2v/c \, \sin \theta_I$$

In terms of radians, $\delta$ may be expressed as a ratio of the separation between ground patches to the range simulated ($R_S$). Assuming that the source velocity is 500 feet per second, the velocity of light=$9.8 \times 10^8$ (or approximately $10^9$ feet per second) and carrier frequency=10 gHz. or $10^{10}$ Hz., $\delta$=one foot in 5,000 feet, $\theta = 30°$ making the sine of $30° = \frac{1}{2}$, and by substituting these values in the preceding equation the Doppler difference frequency between the two ground patches I and II equals one Hz. (Doppler difference frequency). Of course, the other Doppler frequency differences for the series of ground patches may be calculated by the same method and for any variety of velocities, $\delta$'s, carrier frequencies, and azimuth angles.

Figure 2:
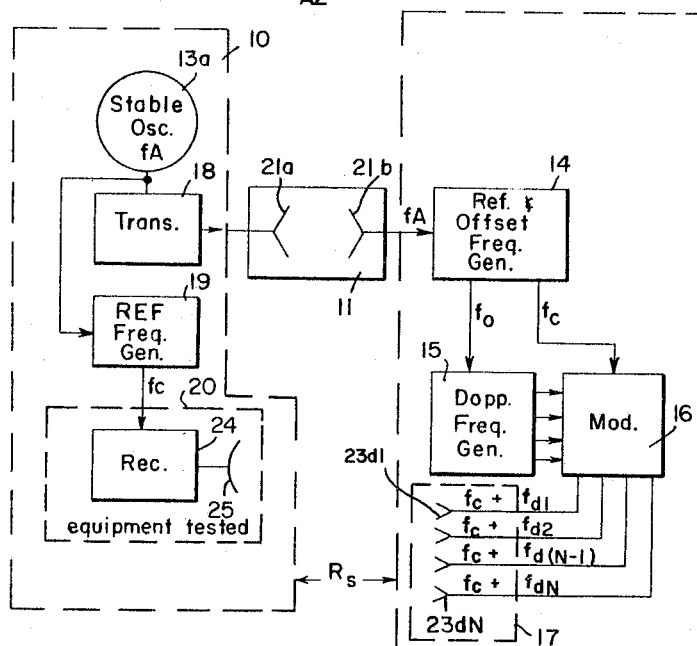
FIG. 2 is a block diagram broadly illustrating the general features of the present terrain simulator system.

Turning now to FIG. 2 there is shown a block diagram broadly illustrating the radar terrain return simulator, also herein referred to as the "simulator" of the present invention. The equipment to be tested at site 10, where the tracking function components are located, is positioned at a distance $R_T$ from the simulator 12 site. A suitable stable low frequency oscillator 13a at the equipment tested site 10 generates a fundamental frequency $f_A$ which is transmitted to the simulator site via the transmission means 11. The transmission means 11 may be a shielded cable 22 (see FIGURE 3) or antennas 21a and 22b (see FIGURE 2). At the simulator site 10, the frequency transmitted thereto is applied to the reference and offset frequency generator 14 which converts the lower frequency $f_A$ to a higher frequency $f_c$ representing the carrier frequency which the receiver 24 is to operate, and also generates an offset frequency $f_0$ which is essential, for reasons discussed later, to the operation of the Doppler frequency generator. This offset frequency $f_0$ is needed to generate the appropriate Doppler frequency shifts within the Doppler frequency generator 15. A series of Doppler frequencies is applied to the modulator 16 which modulates the carrier frequency $f_c$ with each of the Doppler frequencies generated to produce the series of frequencies $f_c + f_{d1}$, $f_c + f_{d2}$ through $f_c + f_{dN}$. Each of these modulated Doppler frequencies are simultaneously coupled to a respective radiator 23d1 through 23dN of the radiating means 17 for transmittal to the equipment tested. A stable oscillator 13a is used to generate a carrier frequency and may be located at test equipment site 10, and provides a common carrier reference frequency to determine the relative Doppler frequency shifts. With stable oscillator 13a being located at test site 10, transmitter 18 would also be located at simulator site 10.

A reference frequency generator 19 is coupled to the output of stable oscillator 13a and provides the reference frequency $f_c$ to a receiver 24, which is part of the equipment under test 20. An antenna 25 is included in this equipment 20 and is coupled to transmit received energy from radiating means 17 to the receiver 24.

Figure 3:
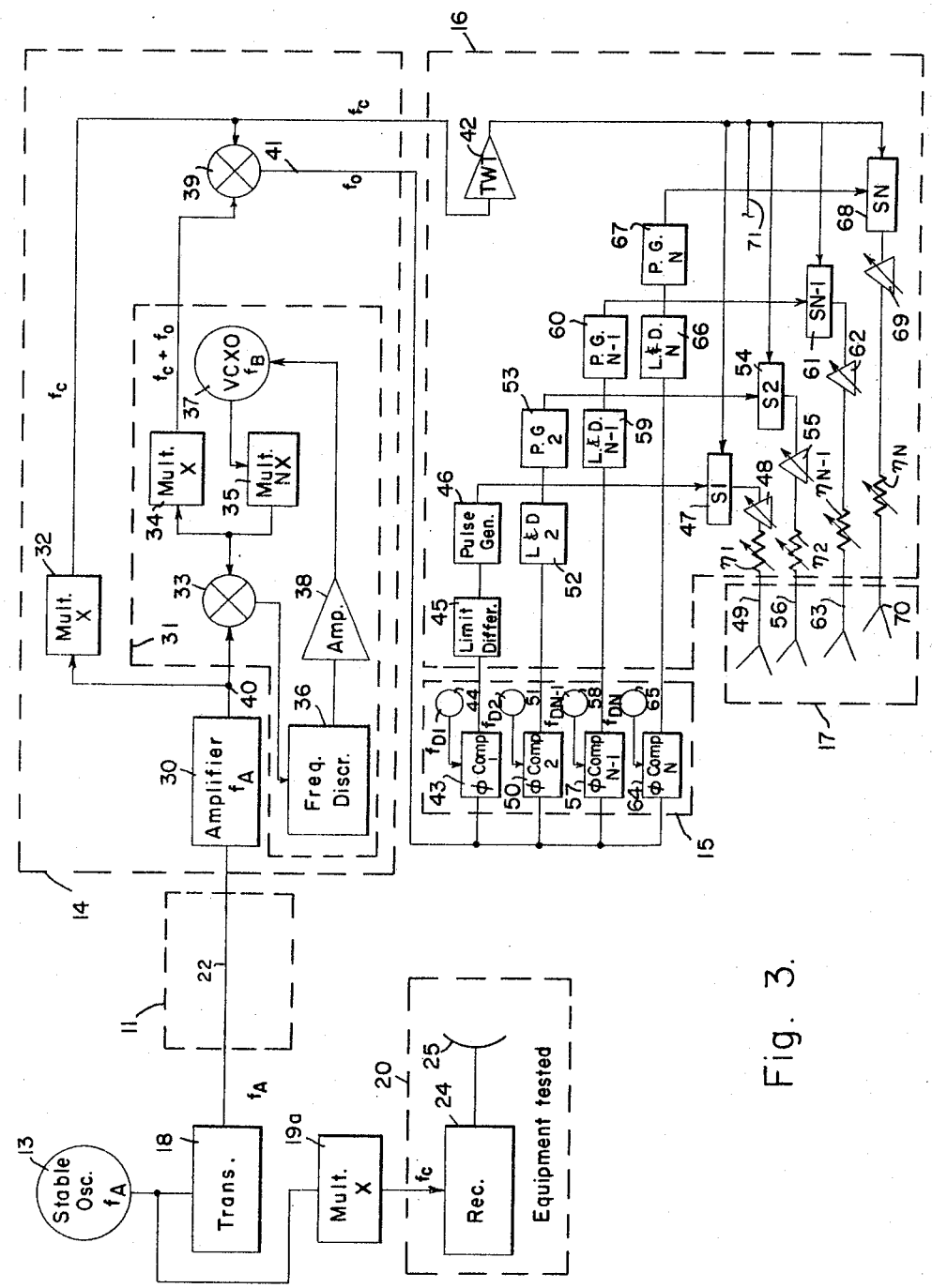
FIG. 3 is a detailed schematic of the system of the present invention for generating a variety of terrain characteristics.

In FIG. 3 a more detailed schematic illustrating an embodiment of the principles of the radar terrain return simulator is shown. The reference and offset frequency generator 14 is coupled to the stable oscillator 13a via the transmission means 11 and transmitter 18. The incoming frequency $f_A$ from the stable oscillator 13a is amplified by the amplifier 30; the output of the amplifier being coupled to the reference frequency generator comprising the multiplier 32 to generate the frequency $f_c$ and to the offset frequency loop 31 for generating the offset frequency $F_0$. The amplified frequency $f_A$ is coupled to the offset frequency loop 31 via the mixer 33. Within the offset frequency loop is a voltage controlled crystal oscillator 37 generating the frequency $f_B$ which is coupled to the NX frequency multiplier 35 which is in turn coupled to the mixer 33. The mixer 33 output is a difference frequency which is coupled to a narrow band frequency discriminator 36. The narrow band frequency discriminator 36 generates a voltage which is amplified by amplifier 38 to control the frequency generated by the voltage controlled crystal oscillator 37. The voltage controlled crystal oscillator 39 generates the frequency $f_B \pm f_z$. These frequencies when put through the NX multiplier 35, which is also coupled to the X-multiplier 34, result in the frequencies $f_c + f_0$. By appropriate filtering within the NX multiplier 35 the purity of the resulting offset frequency $f_0$ is assured. By mixing the two output frequencies of the multipliers 32 and 34 there results the output frequency $f_0$ from the mixer 39. The offset frequency $f_0$ from the mixer 39 is coupled to the Doppler frequency generator 15 and the reference frequency $f_c$ is coupled to the modulator 16. Within the Doppler frequency generator 15 a series of low frequency stable oscillators $f_{D1}$ (44) through $f_{DN}$ (65) generate the Doppler frequencies corresponding to the simulated ground patch separation. Stable oscillators $f_{D1}$ through $f_{DN}$ may be tuning fork type oscillators, or other similarly stable sources. Each of the Doppler frequency oscillators is coupled to a respective phase comparator 43 through 64 which is also coupled to the offset frequency input conductor 41. Typically, when the phase of the offset frequency $f_0$ and the respective Doppler frequency $f_{d1}$ are in phase the phase comparator 43 has an output signal. The output of each phase comparator is coupled to the modulator 16 where the carrier frequency $f_c$ is modulated by each generated Doppler frequency. Within the modulator 16 each of the Doppler frequencies ($f_{d1}$ through $f_{dN}$) generated by the Doppler frequency generator 15 is signal processed by limiting and differentiating by limit differentiator 45 through 66 to generate a series of pulses. The pulses 50 generated are applied to a (S1 through SN) crystal switch (47, 54, 61, 68) each of which receives an input sample of the carrier frequency from a traveling wave tube 42 resulting in the modulation of the carrier frequency by each respective Doppler frequency generated. Sampling of the carrier $f_c$, at the microwave frequencies may, for example, be accomplished by directional couplers, which are well known in the microwave waveguide art. The crystal switches S1-SN may be diodes. Both the directional couplers and diode switches are described in "Microwave Principles," Reich et al., D. Van Nostrand Co., 1957. The modulating function of the switches S1 through SN may also be accomplished by other devices such as ferrite modulators, which are equally well known. Each of the modulated carries containing the Doppler frequency is radiated by the individual array elements of the radiating means 17 to the site of the equipment tested. The radiating means 17 are illustrated as an array of simple horn type antennae (49, 56, 63, 70), and are well known to those skilled in the art.

As an example, but not intended to be limiting in any sense, of a typical simulator site and with reference to the equipment tested site, assume that the range of a target is 25 miles and that the spread of the main lobe beam is ½ mile wide for a 1.15° azimuth beam width. Also assume that the test range $R_S$ is 1 mile. The total length of an antenna assembly under these conditions is a matter of proportions and may be expressed in equation form as:

$$\frac{W_T}{W_S} = \frac{R_T}{R_S}$$

where $W_T$ is the width of a target patch of ground, $W_S$ is the width of the simulated target, $R_T$ is the range of the target, and $R_S$ is the range of the simulated target. By substituting the values just mentioned, the width of the antenna assembly would equal 105.6 feet. Depending upon the number of Doppler signals which are to be processed by the tracking circuits the antenna spacing and the number of antennas are determined. The arrangement of the radiating antennas may be planar or linear arrays; however, a linear array is preferred. A further limitation on the number of radiator elements is the physical size of each antenna; the physical size is a function of the frequencies utilized and the higher the frequency the narrower the width of the antenna (e.g.: 20 db horn type antennas at x-band frequency are approximately 2″ wide).

Where shorter test ranges are available, that is where the distance between the simulator and the equipment under test is less than 1 mile, then the near field effect of a radiating antenna must be taken into consideration. Satisfactory results are obtainable where the terrain simulator is beyond the near field distance $2D^2/\lambda$, where D is the physical width of the antenna and $\lambda$ is the wavelength.

The schematic representation of the modulator 16 of FIG. 3 includes the phase shifters 48, 55, 62 and 69 and attenuators $\eta_1$ through $\eta_N$ respectively coupled to each of the antennae 49, 56, 63 and 70. These attenuators and the phase shifters may be either fixed or variable; however, the variable types permit greater flexibility in the operation of the terrain return simulator. Typically, by adjusting the attenuator $\eta_1$ the amplitude of the simulated Doppler signal $f_{d1}$ is made variable or may be adjusted to an amplitude equal to the amplitude of the remaining signals. The amplitude adjustment provides a means to simulate a variety of radar returns which permit an exact replica of ground terrain returns. The other characteristics of ground returns, being phase shifts, are simulated by the variable phase shifters.

Figure 4:
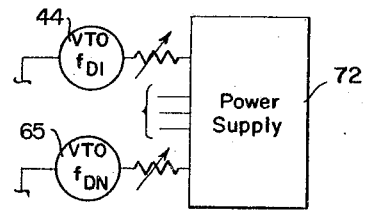
FIG. 4 is a block diagram of a series of Doppler frequency oscillators useable within the Doppler frequency generator and having tuneable features.

In FIG. 4 there is shown a series of Doppler frequency oscillators 44 and 65 which are variable. By having a series of stable and tuneable oscillators, such as the voltage tuneable type, at low frequency coupled to an accurately tuneable power supply 72 a variety of Doppler frequency ranges may be generated by the Doppler frequency generator 15 of FIG. 3. This capability of having a wide Doppler frequency tuning range permits flexibility in simulating the variety of velocities of a moving source.

In FIGS. 5 and 6 there are shown typical frequency spectra generated by the radar return simulator. The FIG. 5 illustrates a typical frequency spectra showing the upper and lower sidebands of the modulated carrier frequency $f_c$. The upper sideband spectra includes the frequencies $f_{d1}$ through $f_{dN}$ centered about the frequency $f_c+f_{dd}$, the frequency $f_{dd}$ represents the central frequency of the group $f_{d1}$ through $f_{dN}$. These "n" spectral lines are sohwn as having equal amplitudes as a result of the amplitude adjustors $\eta_1$ through $\eta_N$ of FIG. 3. Each of the spectral lines are separated by the Doppler difference frequency which is predetermined and generated by the Doppler oscillators $f_{D1}$ through $f_{DN}$ corresponding, respectively, to spectral lines $f_{d1}$ through $f_{dN}$.

There is shown in FIG. 6 the upper sideband spectra for a simulator in an embodiment having 51 Doppler oscillators and antennas. This upper sideband portion is typical of that part of the spectrum utilized in testing the target tracking circuitry. In the illustration of FIG. 6 the carrier frequency is not shown; however, it exists to provide the necessary reference for determining the Doppler frequency shifts. The variations in amplitudes shown typically as A1, A2, A3, and A4 are as a result of the setting of the respective amplitude adjustments $\eta_1$ through $\eta_4$; variations in amplitude of the radar terrain return signals are a characteristic of actual terrain return signals. The table below is a tabulation of typical values usable in an embodiment of the present invention wherein 51 Doppler frequencies are generated spaced 2Hz. apart for a carrier frequency 10GHz. The value of 2Hz. was determined by the use of the formula previously mentioned:

$$f_{diff} = f_c \, 2v/c \, \delta \, \sin\theta$$

In this formula $f_{diff}$ is the common difference frequency among the oscillators $f_{D1}$ through $f_{D51}$, $f_c = 10^{10}$ Hz., $\delta = 1$ foot per 5,000 feet, $\theta = 30°$ and $v = 1,000$ feet per second (681.8 miles per hour). Within the table $f_{D26}$ corresponds to $f_{dd}$ of FIG. 5.

| Antenna | Doppler Osc. | Doppler Frequency (Hz.) | Transmitted Frequency After Modulation (GHz.) |
|---|---|---|---|
| Ant 1 | $f_{D1}$ | 3550 ($f_{d1}$) | 10.000 000 3550 |
| Ant 2 | $f_{D2}$ | 3552 ($f_{d2}$) | 10.000 000 3552 |
| Ant 3 | $f_{D3}$ | 3554 ($f_{d3}$) | 10.000 000 3554 |
| Ant 26 | $f_{D26}$ | 3600 ($f_{d26}$) | 10.000 000 3600 |
| Ant 49 | $f_{D49}$ | 3644 ($f_{d49}$) | 10.000 000 3644 |
| Ant 50 | $f_{D50}$ | 3646 ($f_{d50}$) | 10.000 000 3646 |
| Ant 51 | $f_{D51}$ | 3648 ($f_{d51}$) | 10.000 000 3648 |

Turning now to FIG. 7 there is shown an embodiment of the present invention wherein frequency modulation is utilized. The stable oscillator $f_A$ (13) is coupled through the amplifier 30a to the reference frequency generator 14, which is in this case the multiplier 91, to generate the carrier frequency $f_c$. The line carrying the carrier frequency $f_c$ is sampled by the directional couplers 92 through 93. The line termination 100 is also provided. The Doppler frequency oscillator 16 comprising oscillators $f_{D1}$ (94) through $f_{DN}$ (95) are coupled to the frequency modulator 16. Frequency modulation of the carrier by the Doppler frequencies is accomplished by the use of traveling wave tubes designated as TWT1 (98) through TWT(N) (99). These traveling wave tubes are well known to those skilled in the art and are described in "Microwave Principles" by H. J. Reich et al., 1957, D. Van Nostrand Co., Inc. Also, the frequency modulator using traveling wave tubes is described in the Hewlett-Packard Journal, volume 7, No. 5, January 1956. Typically and by appropriate connections the sample carrier frequency $f_c$ is coupled to the traveling wave tube 98 and the modulating frequency, in this case the Doppler frequency $f_{d1}$ from the Doppler oscillator $f_{D1}$ (94), is coupled to the helix supply 96 of the traveling wave tube 98 to bring about frequency modulation of the carrier. Also, the amplitude and phase adjustments can be made separately for each Doppler frequency generated by the respective amplitude ($\eta_1$ through $\eta_N$) and the phase adjustors (48a through 69a). Each of the frequency modulated carriers is coupled to the respective radiating element of the array 17. Of course, frequency modulation may also be accomplished by ferrite modulators which are equally as well known as traveling wave tube modulators and are described in the article "Microwave Single Sideband Modulators Using Ferrites," Proceedings of the IRE, 42, 1954, pages 1242 through 1247. Another form of traveling wave tube modulator suitable for use as the modulator 16 as described in FIG. 7 is the "Traveling Wave Tube with Independent Phase and Amplitude Control," U.S. Patent 3,028,597, by J. B. Cicchetti, et al.

While several embodiments of the present invention have been shown and described, it is intended that the foregoing shall be construed only as illustrative of the principles of the invention and not limiting in any sense.

What is claimed is:

1. A system for simulating the characteristics of radar terrain return signals for the performance test of a radar system, comprising:
    means for generating a plurality of low frequency output signals, each of said plurality of low frequency output signals having a predetermined frequency spacing with respect to each other;
    means, coupled to said generating means and adapted to receive a carrier reference signal, for simultaneously modulating sampled portions of said received carrier reference signal energy and having outputs comprising a plurality of modulated carrier signals;
    a first transmission means, adapted to receive a reference carrier frequency common to said modulating means, for coupling said reference carrier between said means for modulating and said radar system being tested; and
    second transmission means, coupled to the outputs of said means for modulating, for transmitting each of said modulated signals to said radar set being tested.

2. A system for simulating the characteristics of radar terrain return signals, for the performance test of a radar system, comprising:
    a source of stable radio frequency carrier reference signal;
    means for simultaneously generating a plurality of closely spaced audio frequency output signals, the frequency spacing of said audio frequency output signals being predetermined;
    means, coupled between said source and said means for generating, for simultaneously modulating sampled portions of said radio frequency reference carrier signal energy and having a plurality of modulated RF output signals;
    first transmission means for coupling said reference carrier source between said means for modulating and said radar system being tested; and
    second transmission means, coupled to the outputs of said modulating means, for separated transmission of each of said modulated RF signals to said radar set being tested.

3. An apparatus for generating closely spaced radio frequency signals simulating the characteristics of radar terrain return signals for performance testing of a radar system, the combination comprising:
    a source of stable microwave frequency carrier reference signal;
    Doppler frequency generator means for simultaneously generating a plurality of closely spaced in frequency audio frequency output signals, the frequency spacing of said audio frequency output signals being predetermined;
    modulator means coupled between said source and said Doppler frequency generator for simultaneously modulating a plurality of energy samples of said reference carrier signal energy and having a plurality of modulated RF signals as outputs;
    first antenna means for coupling said source between said modulator and said radar system being tested; and
    second antenna means coupled to the outputs of said modulator for the separate transmission of each of said plurality of modulated RF signals.

4. In an apparatus according to claim 3 wherein said Doppler frequency generator means comprises:
    a plurality of stable oscillators, each of said oscillators having an audio output signal different from each other.

5. In an apparatus having a Doppler frequency generator according to claim 4 wherein each of said oscillators are tuneable in frequency.

6. In an apparatus according to claim 5 wherein said tuneable oscillators comprises:
    a variable power supply and a voltage tuneable crystal oscillator coupled to said power supply.

7. In an apparatus according to claim 3 wherein said modulator means comprises:
    a plurality of frequency modulators, each coupled to said Doppler frequency oscillator means at a respective audio frequency output and coupled to said source of microwave carrier signal for modulating in frequency each of said microwave signals with a respective audio output signal.

8. In an apparatus according to claim 7 wherein the modulator means combination includes: a plurality of phase adjustors each coupled to a respective frequency modulator to control the phase shift of each of said frequency modulated RF output signals.

9. In an apparatus according to claim 7, wherein the modulator means includes in combination:
    a plurality of amplitude adjustors, each adjustor being coupled between a respective frequency modulator and to said second antenna means, for controlling the amplitude of each of said frequency modulated RF output signals.

10. In an apparatus according to claim 7 wherein each of said plurality of frequency modulators comprises:
    a traveling wave tube having a helix supply coupled thereto and adapted to receive a sample of said microwave carrier signal, said helix supply being coupled to said Doppler frequency generator means at a respective audio frequency signal output.

11. In an apparatus according to claim 3 wherein said second antenna means comprises:
    a plurality of antennas each coupled to a respective modulated RF signal output of said modulator.

12. In an apparatus according to claim 11 wherein said plurality of antennas are horn antennas.

13. In an apparatus according to claim 11 wherein said plurality of antennas are arranged on a linear array to establish predetermined directional characteristics.

14. In an apparatus according to claim 3 wherein the combination includes:
    a plurality of amplitude adjustor means, each having an input and an output, each said input being coupled to a respective modulated RF output signal of said modulator means, and said output being coupled to said second antenna means, for controlling the amplitude of each of said respective modulated RF output signals.

15. In an apparatus according to claim 3 wherein said modulator means comprises:
    a plurality of pulse modulators, each coupled to said Doppler frequency oscillator means at a respective audio frequency output and coupled to said source of mircowave carrier signal, for pulse modulating each of said microwave signals with pulses derived from said audio output signal.

16. In apparatus for testing a radar including a simulator for generating simulations of ground terrain characteristics, the simulator being positioned at a site remote from the radar under test and comprising:
    a means for generating a plurality of Doppler signals at differing frequencies;
    a first transmitter for transmitting the plurality of Doppler frequencies to the radar under test, said first transmitter being coupled to said generating means; and
    a second transmitter for transmitting a carrier signal to said simulator and to the radar under test, whereby the frequencies generated by said simulator are in synchronism with the frequency of the radar under test.

17. A method for ground testing the terrain tracking performance capability of an airborne type radar system, the radar system having a receiver and antenna tracking loop circuitry and located at a test site, comprising the following steps:
(A) generating a carrier reference frequency $f_c$ at RF level;
(B) generating a group of low frequency signals designated $f_{d1}$ through $f_{dN}$, each of said low frequency signals in the group having a predetermined frequency spacing with respect to each other, said group of frequencies being generated at a site physically remote from said radar system test site;
(C) coupling said carrier reference frequency $f_c$ between said radar system and the site of said generation of the group of low frequency signals;
(D) modulating sampled energy portions of said carrier reference frequency $f_c$ with each of said low frequency signals $f_{d1}$ through $f_{dN}$ to produce a group of modulated RF output signals; and
(E) transmitting with precision directivity each of said group of modulated output signals from said remote site to the said receiver and tracking loop located at test site of said radar system being tested.

18. A method for ground testing the performance capability of an airborne type radar system according to claim 17 wherein step D includes:
deriving a series of pulses from each of said low frequency signals; and
modulating said energy samples of said reference frequency with said derived pulses.

19. A method for ground testing the performance capability of an airborne type radar system according to claim 17 wherein step D includes:
applying each of said sampled portions of said carrier reference frequency to an input of a respective traveling wave tube amplifying device, said amplifying device having a helix supply also coupled thereto; and
coupling each of said group of low frequency signals to said helix supply, and thereby frequency modulating said energy samples of the said reference carrier with each of said low frequency signals.

20. A method for ground testing the performance capability of an airborne type radar system according to claim 17, wherein step D includes:
adjusting the amplitude of each of said group of modulated RF output signals.

References Cited
UNITED STATES PATENTS

| | | | |
|---|---|---|---|
| 3,138,797 | 6/1964 | Steinberg | 343—17.7 |
| 3,214,758 | 10/1965 | Mills et al. | 343—17.7 |

RICHARD A. FARLEY, *Primary Examiner.*

RODNEY D. BENNETT, *Examiner.*

T. H. TUBBESING, *Assistant Examiner.*